(12) United States Patent
Zuck

(10) Patent No.: US 7,766,039 B2
(45) Date of Patent: Aug. 3, 2010

(54) QUICK CONNECT FUEL HOSE CONNECTOR

(75) Inventor: James C. Zuck, Marshall, MI (US)

(73) Assignee: Marshall Excelsior Company, Marshall, MI (US)

(*) Notice: Subject to any disclaimer, the term of this patent is extended or adjusted under 35 U.S.C. 154(b) by 26 days.

(21) Appl. No.: 12/103,529

(22) Filed: Apr. 15, 2008

(65) Prior Publication Data

US 2009/0256350 A1 Oct. 15, 2009

(51) Int. Cl.
*F16L 37/28* (2006.01)
(52) U.S. Cl. .............................. 137/614.04; 137/614.05
(58) Field of Classification Search ................................. 137/614.03–614.05
See application file for complete search history.

(56) References Cited

U.S. PATENT DOCUMENTS 4,807,578 A * 2/1989 Adams et al. ........... 123/198 A
5,649,723 A * 7/1997 Larsson ....................... 285/322
6,655,498 B1 * 12/2003 Sasa et al. .............. 137/614.04
7,490,864 B2 * 2/2009 Cheng .................... 137/614.05

* cited by examiner

*Primary Examiner*—Kevin L Lee
(74) *Attorney, Agent, or Firm*—Waters & Associates; John A. Waters

(57) ABSTRACT

A quick connect fuel hose connector for connecting an LP fuel hose to a threaded inlet fitting on a vehicle or appliance fuel tank comprises an annular body having an inlet for fuel at an inner end and an outlet for fuel at a recessed opening in an outer end. Latch members pivotally mounted in slots on opposite sides of the body engage and latch the connector to the fuel tank inlet fitting when the connector is fitted over the inlet fitting. A lost motion spring seal maintains a tight seal between the connector and the inlet fitting. A replaceable nose seal on an outlet valve in the connector provides an improved sealing connection between the connector outlet valve and the fuel tank inlet valve.

7 Claims, 3 Drawing Sheets

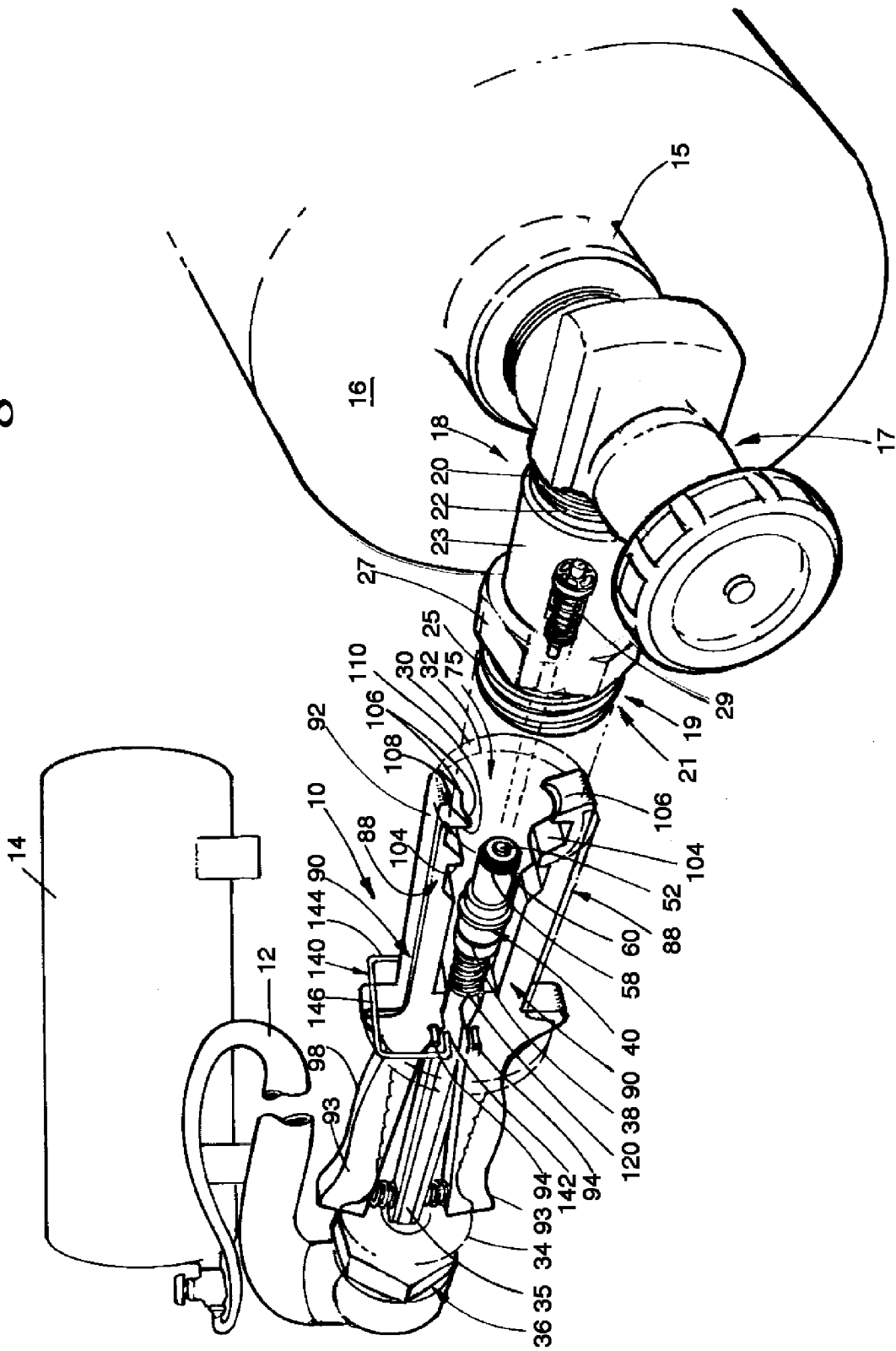

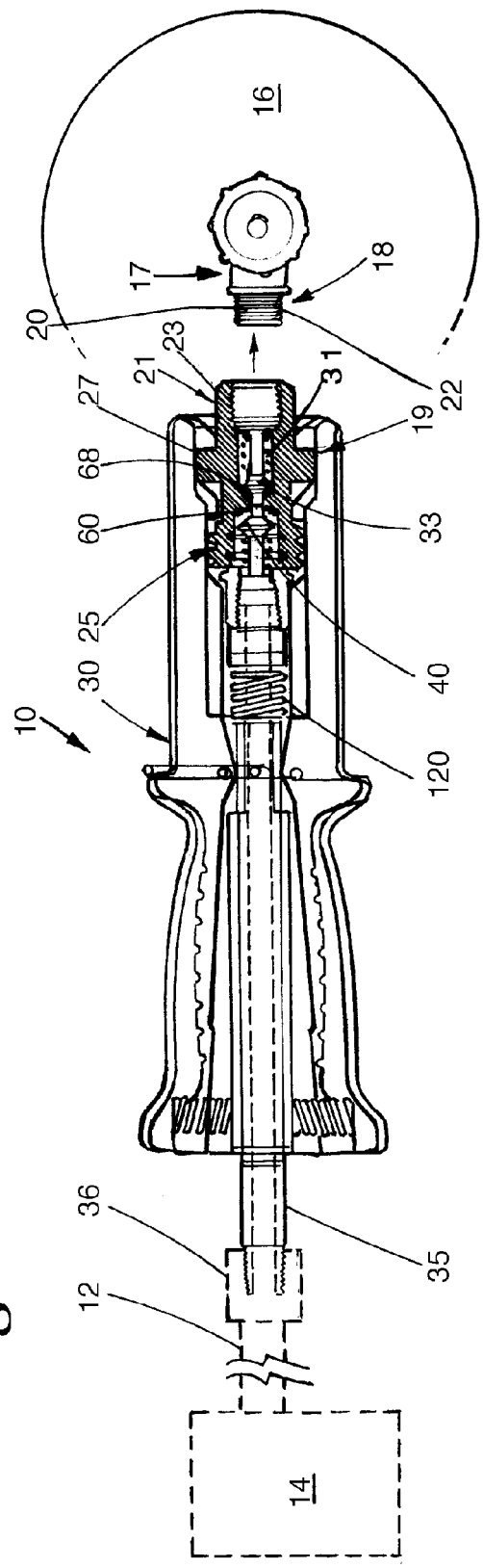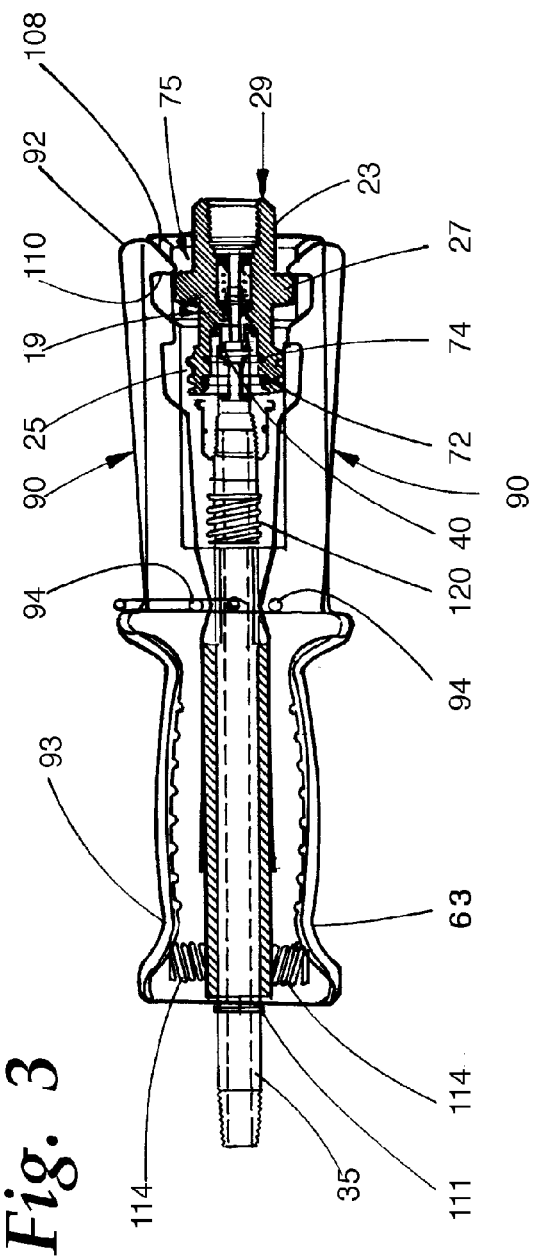

QUICK CONNECT FUEL HOSE CONNECTOR

CROSS-REFERENCE TO RELATED APPLICATIONS

Not Applicable.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO A SEQUENCE LISTING

Not Applicable.

BACKGROUND OF THE INVENTION

The present invention relates to a quick connect hose connector for transferring liquefied gas fuel from a pressurized storage tank to a fuel tank for a vehicle or other appliance.

A number of vehicles, such as forklift trucks, operate on propane or other LP gas, which is stored in a fuel tank on a mobile vehicle. These fuel tanks require refilling periodically, which is typically from a large fixed or mobile storage tank. In a commercial operation for filling motor fuel cylinders with LP gas or propane for forklift trucks, a fuel distribution center may fill up to 3,000 tanks per day.

At the present time, the most common means for filling fuel tanks or cylinders employs a screw connector wherein a threaded female coupling on a fuel hose is threaded on a threaded male fitting mounted on the outlet of a mobile fuel tank. Threading and unthreading a screw connector involves a great deal of time, and the repetitive action can promote operator injury, such as carpal tunnel syndrome.

Some quick connect fittings have been developed, but they have thus far been cumbersome and expensive.

An object of the present invention is to provide a quick connect fitting for connecting a fuel supply hose to a threaded fitting on a storage tank that is simple and safe, preserves fuel, and maintains an appropriate level of sealing force over a range of operating conditions.

SUMMARY OF THE INVENTION

The present invention comprises a quick connector for connecting a fuel supply hose to a threaded inlet fitting on a liquefied gas tank on a gas driven vehicle or other appliance. The connector includes a generally annular body surrounding a recessed interior passage through which fuel can flow. The connector is attached to a supply hose at an inner end and is releasably connectible at an outer end to a conventional externally threaded fuel container inlet or service fitting. An outwardly biased connection outlet valve mounted in the outer end of the quick connect fitting urges the outlet of the connector to a normally closed position. When the hose connector is attached to the tank inlet, a protruding stem on the connector outlet valve engages a mating stem of an outwardly biased, normally closed inlet valve in the fuel tank inlet fitting. This causes the hose connector valve to open allowing fuel to flow from the storage tank, and the pressure of the flowing fuel opens the inlet valve to the fuel cylinder. A compressible, replaceable tip seal is mounted on the nose of the connector shut off valve, providing a secure face seal between the connector and the tank inlet valve.

The hose connector comprises a latch mechanism at the outer end, with the latch mechanism including pivoting latch members mounted in longitudinal slots that run lengthwise along the connector on opposite sides thereof. The latch members include inwardly extending flanges at the outer end that fit over and engage the threads and/or the nut on the inlet fitting mounted on the fuel container, creating a tight clamping fit without the need to thread the connector on the fuel tank inlet fitting. The flanges of the latch members are inwardly biased but can be released by squeezing together the outer ends or handles of the latch members opposite the flanges, causing the latch members to pivot open and release the threads of the fuel container.

The invention also includes an integrated swivel in the fuel supply connector. Also, a thrust spring maintains a consistent latch engagement force over a varying range of tank fitting sizes.

The housing of the connector fits over the tank fitting so as to guide the mating connector and tank valves into proper alignment and connection. The housing also guards against unintentional actuation of the valve, which is protected within the connector housing and which self-aligns with the storage tank inlet valve. In one embodiment, proper alignment and connection are further encouraged by the length of the valve of the current invention, which may exceed the length typical of other valves in the field. In addition, the invention provides a visual indication of when the connector is engaged, as the latch members protrude from the sides of the connector body when the connector is not latched over the fuel container inlet fitting.

These and other features, objectives, and benefits of the invention will be recognized by one having ordinary skill in the art and by those who practice the invention, from this disclosure, including the specification, the claims, and the drawing figures.

BRIEF DESCRIPTION OF THE DRAWINGS

FIG. 1 is a perspective view of the quick fill connector of the present invention, shown connected to a fuel supply tank and a vehicle tank and shown partially broken away to illustrate the interior components of the connector;

FIG. 2 is a longitudinal sectional view of the quick fill connector of the present invention, shown in a latched condition on a threaded fuel tank connector;

FIG. 3 is a longitudinal sectional view of the connector, as in FIG. 2, wherein the connector is shown in a released condition.

DETAILED DESCRIPTION OF THE INVENTION

Figure 4:
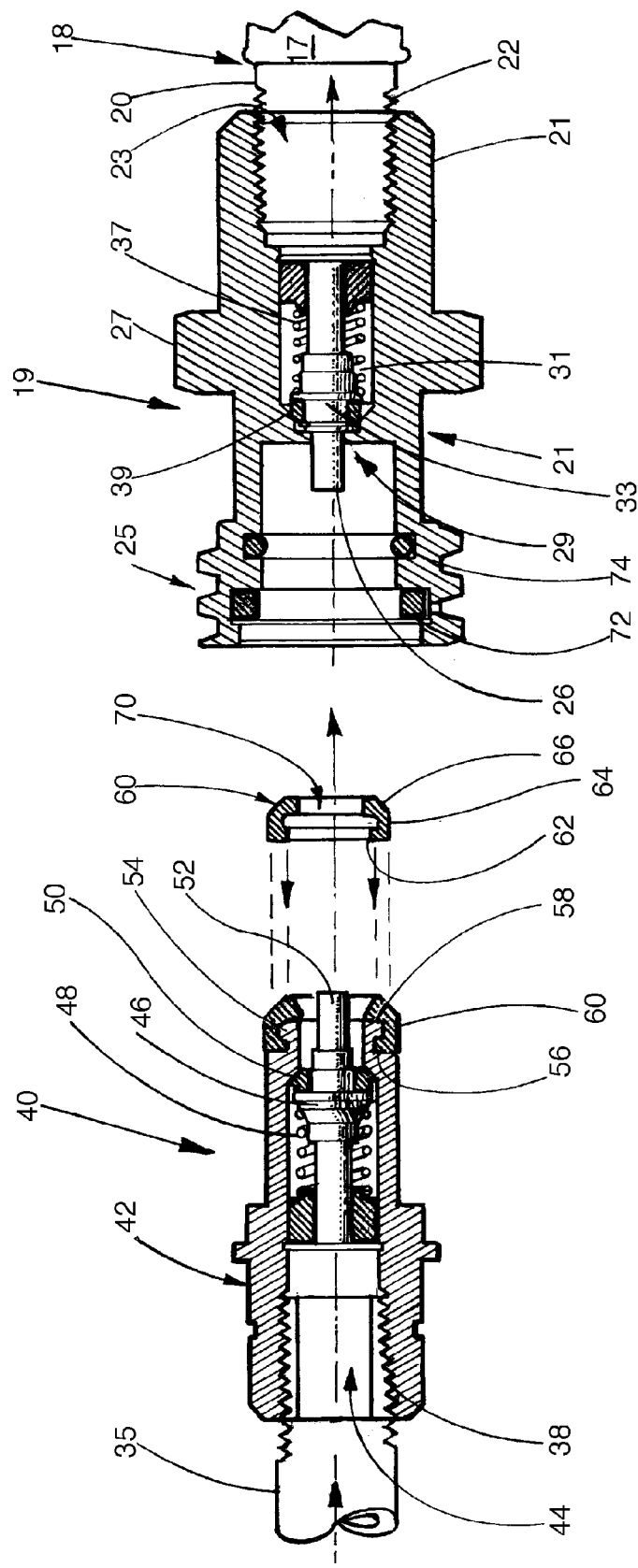
FIG. 4 is a longitudinal exploded sectional view showing the shut off valve and replaceable seal of the present invention in position to mate with the fuel tank inlet valve.

In accordance with the present invention, a connector 10 is shown in FIG. 1 attached to a fuel supply hose 12 that is attached in turn to a fuel storage tank 14. The fuel storage tank can be a fixed tank as shown, or it can be a mobile fuel supply tank mounted on a truck or the like. The fuel supplied by the tank is propane or other LP gas, which is a gas at atmospheric pressure but which is a liquid when maintained in a pressurized storage container.

The present invention is particularly adapted to the transfer of pressurized LP gas to mobile fuel tanks of the type used on forklift trucks or the like. The apparatus of the present invention, however, can be applied also to the pressurized transfer of anhydrous ammonia, although stainless steel components are necessary for use with anhydrous ammonia. For exemplary purposes, the present invention is described in connection with a fuel transfer operation wherein a vehicle such as a forklift truck is supplied with LP gas from a storage tank.

The present invention is designed to be used in connection with a conventional vehicle LP gas tank or canister 16 of conventional design. Such a tank has a service valve 17 having an inlet 18 comprising an annular collar 20 having a threaded outer surface 22 employing a pipe thread. The service valve screws into an internally threaded collar 15 on the tank inlet. An inlet valve 19 (which is usually referred to as an "outlet" valve because the service valve delivers fuel to a vehicle or appliance) is screwed on the service valve inlet 18. Inlet valve 19 includes an annular body 21 having an internally threaded outlet 23 at one end and an externally threaded inlet 25 at an opposite end. Outlet 23 is adapted to be screwed onto the externally threaded inlet 18 of service valve 17. A radially extending flange 27 having flat sides serves as a nut for bolting the adapter fitting 19 to inlet 18. Externally threaded 25 inlet is provided with acme threads or other conventional threads that are used to attach a conventional fuel delivery hose connector to the tank. An outwardly biased, normally closed valve 29 is mounted in the open interior 31 of inlet valve body 21. Valve 29 includes moveable valve member 33 biased by spring 37 toward a valve seat 39 positioned outwardly from valve member 33. A projection 26 extends from an end of the valve member through valve seat 39.

Hose connector 10 comprises an elongated, generally annular body 30 formed of synthetic resin or the like, with the body having an outer end 32 and an inner end 34, with a fuel delivery tube 35 extending through the body between the inner and outer ends. As used herein, the term "outer" will generally refer to the direction of fuel flow from the storage tank to the vehicle tank. The inner end of tube 35 is attached to a swivel connection 36 that connects to the outer end of supply hose 12. The swivel connection permits body 30 to be rotated with respect to the fuel hose. The outer end of fuel delivery tube 35 is threaded and is screwed into engagement with an internally threaded inlet opening 38 in a connector outlet valve 40.

Connector outlet valve 40 includes an annular body 42 having an open interior 44 extending through the body and having a valve member 46 moveably mounted in the open interior. Valve member 46 is spring biased by a spring 48 outwardly to a closed position against a valve seat 50 positioned outwardly from the valve member. A projection 52 extending from valve member 46 extends through valve seat 50 to the outer side thereof. The annular outlet valve body 42 also extends beyond valve seat 50 to form a collar 54 on the outer side of the valve seat. Collar 54 has a peripheral groove 56 adjacent the outer end or nose 58 thereof. A resilient compressible seal 60 fits on the end of nose 58 (shown mounted and separate in FIG. 4). An inwardly projecting peripheral flange 62 on a skirt 64 of the seal fits in groove 56 and resiliently holds the seal on the end of nose 52. The seal has a beveled outer surface 66 that mates with a valve seat 68 in the interior of adapter fitting 19. Seal 60 has an interior opening 70 therethrough that permits LP gas to flow through the seal into the interior of fuel delivery tube 35 when seal 60 is nested against valve seat 68 of adapter valve 19. The nose seal thus provides an additional seal, over and above interior O ring seals 72 and 74 that are conventionally mounted in the interior opening of adapter 19. In the exemplary embodiment, the seal is formed of a Teflon impregnated carboxulated nitrile material. Other materials can be used.

The nose seal permits a face seal between opposing valve elements and provides substantial additional protection against fuel leakage.

While the nose seal feature is described in connection with the quick connect outlet valve of the present invention, the same nose seal feature can advantageously be employed with other LP fuel connectors. For example, the nose seal can be employed with a threaded fuel hose delivery outlet, and it can be employed in a fuel line connector between the carburetion fuel line and the service valve on a motor fuel type application.

Hose connector 10 provides a means for connecting a connector outlet valve to the adapter fitting of the vehicle fuel tank without having to screw the two components together with conventional threaded fittings, while still insuring a tight seal. Connector body 30 has a recessed interior opening 75 extending inwardly from an open outer end thereof. Tube 35 and attached connector outlet valve 40 are mounted in the interior opening, and the adapter 19 and adapter valve 29 fit inside this opening in order to mate with connector outlet valve 40. The tubular body of the connector guides these two valves into engagement with each other and insures that they are properly aligned, while protecting the valves from damage.

Body 30 includes opposing slots 88 on opposite sides of the body and latch members 90 are pivotally mounted in the slots by pivot pins 94 that extend transversely through intermediate positions 96 on the latch members. Latch members 90 have outer and inner ends 92 and 93, with outer end 92 extending from the pivot pin 94 toward the outer end 32 of the connector body 30, and inner end 93 extending from the pivot pin 94 toward the inner end 34 of the connector body. Latch members 90 have outer surfaces 98. The outer ends 92 of latch members 90 have inwardly extending flanges 104 and 106, with the flanges having downwardly and inwardly inclined outer surfaces 108 and generally perpendicular inner surfaces 110. Flanges 104 fit over radially outwardly extending nut flange 27 on the fuel container adapter fitting 19. Flanges 106 on the latch members fit over acme threads 25 on the end of the fuel container adapter fitting.

Springs 114 extend between ends 93 of the latch members 90 and the tube 35 near the inner end 34 of the connector body. Pressing together the latch handles formed by ends 93 causes springs 114 to compress and causes the opposite ends 92 in flange elements 104 and 106 to pivot outwardly, releasing the latch. Releasing ends or handles 93 permits springs 114 to expand, forcing ends 93 to pivot outwardly and causing the latch members at ends 92 to pivot inwardly, so as to latch the fuel connector on the fuel tank inlet after the connector valve and fuel tank inlet valves have been connected together.

In order to provide a secure latching action and compensate for some differences in valve sizes, the connector outlet valve is resiliently movable with respect to the latch members. Tube 35 and the attached outlet valve are slidable longitudinally in the handle. A spring clip 111 limits forward or outward movement of the tube. The attached outlet valve restricts inward movement of the tube. A compression or thrust spring 120 is positioned on the tube between the connector outlet valve and the base of the opening in the outer end of the connector handle. When the connector is fitted on a tank inlet, the connector outlet valve and the tank inlet valve mate, so that both valves open. In order to secure a firm mating engagement of the valves, it is necessary that the connector body be firmly engaged with the vehicle tank inlet. To provide for a secure, resilient connection when the valves engage, spring 120 permits the connector outlet valve to yield resiliently until the valves are securely seated. When the latch members close, spring 120 urges the engaged valves outwardly into latching position with the closed latch members. Spring 120 ensures that the two valves remain seated together with sufficient spring pressure to maintain a sealed contact between themselves and the latch members.

Another feature of the present invention is the incorporation of a hanging bracket 140 on the body of the connector. Hanging bracket 140 can be a U shaped member formed of wire rod or the like that is attached at inwardly extending ends 142 at the ends of legs 144 of the member. A back portion 146 extending between the legs can be attached to a support member, such as a strap or the like attached to a support structure, so as to suspend the connector at a desired elevation above the ground. This makes it possible to pivot the connector into engagement with a fuel tank inlet at a particular repeated elevation, without having to lift the connector up to that elevation each time a vehicle tank is filled. This can speed the filling operation when the connector is used to repeatedly fill tanks having inlets at the same elevation.

The body of the connector can be formed of any desirable material and preferably is formed of a synthetic resin having insulating properties that prevent the operator's hand from becoming too cold. The shape of the handle can be designed for operator comfort, and flanges can be placed on the outer and inner ends in order to prevent an operator's hand from sliding inwardly or outwardly off the handle. The gripping surface of the handle can have a textured finish so as to improve gripping characteristics.

It should be understood that the foregoing is merely representative of the preferred practice of the present invention and that various changes may be made in the arrangements and details of construction of the embodiments disclosed herein without departing from the spirit and scope of the present invention.

What is claimed is:

1. A quick connect fuel hose connector for transferring liquefied gas fuel from a storage tank to a vehicle fuel cylinder, wherein the vehicle fuel cylinder has an inlet valve positioned in an externally threaded inlet fitting, the inlet valve comprising a movable valve member that is outwardly biased to a normally closed position against a valve seat, the quick connector comprising an annular connector body having an open end that fits over the fuel cylinder inlet fitting, the body having longitudinal slots on opposite sides thereof, latch members being pivotally mounted in the slots, the body having an open interior passage through which fuel can flow from the storage tank to the vehicle fuel cylinder through a fuel delivery tube that extends through the open interior passage, the fuel delivery tube including a fuel hose connector at an inner end thereof, the latch members having one or more inwardly extending flanges at outer ends of the latch members, said flanges being adapted to fit over and engage the fuel tank inlet fitting to connect the quick connector with the fuel cylinder inlet fitting, the latch members being biased in a latching position, the connector further including an outwardly biased, normally closed outlet valve connected to an outer end of the fuel delivery tube in the open interior passage in the connector body, the outlet valve including a valve member axially movable in an interior of an annular valve body, a valve seat being positioned in the interior of the valve body so as to be engaged by the valve member when the outlet valve is closed, the valve body having an annular collar that extends outwardly from the valve seat, the outlet valve further having a replaceable, resilient tip seal releasably attached on an outer end of the annular collar, the tip seal being formed and mounted such that the tip seal engages the bottom of an interior opening in the inlet fitting and restricts fluid leakage between the hose connector and fuel cylinder inlet fitting.

2. A connector as in claim 1 wherein the collar has a peripheral groove formed in an outer side thereof and the tip seal has a peripheral skirt with an inwardly extending flange thereon that resiliently clips in the groove.

3. A connector as in claim 1, further comprising a hanging member securely attached to the body near the pivot pins, the hanging member serving as a means to suspend the connector at a convenient elevation for connection to a fuel tank inlet at said elevation.

4. A connector as in claim 2 wherein the connector outlet valve is longitudinally movable in the interior passage and is resiliently biased by a spring in an outward direction, the spring providing a lost motion connection with the fuel tank inlet valve and providing resilient pressure urging the two valves together.

5. A hose connector for connecting a liquid petroleum gas fuel delivery hose to a fuel inlet of a mobile fuel canister, wherein the canister fuel inlet includes an outwardly extending collar having an open interior, the collar having external projections thereon formed by one or more of external threads on an integral nut formed on the collar, the hose connector comprising:

an annular body having an outer end and an inner end, the outer end fitting over the fuel canister inlet collar so as to position the body in alignment with the fuel canister fuel inlet;

one or more latch members movably mounted in slots in sides of the body for inward and outward movement with respect to the body, the latch members having inwardly extending flanges that are shaped to engage the external projections on the collar and thereby hold the hose connector in engagement with the fuel inlet of the mobile canister, the flanges being inwardly biased toward engagement with the collar projectors but being manually releasable to permit removal of the connector from the fuel inlet;

a fuel delivery tube axially positioned in the interior of the hose connector body, the fuel delivery tube having an inlet and outlet at opposite ends thereof, the delivery tube inlet being adapted to be connected to a fuel delivery hose outlet so as to receive pressurized fuel therein, the fuel delivery tube being axially movable with respect to the annular body at least for a limited range of mobement betwe4en extended and retracted positions, the delivery tube being resiliently biased toward an extended position;

an outlet valve mounted on the outlet of the fuel delivery tube, the outlet valve being a normally closed, outwardly biased one-way flow control valve comprising an annular valve body with an open interior and an interior valve seat and an axially movable valve member mounted in the open interior for movement into and out of engagement with the valve seat, the valve seat being downstream from the valve member and the valve member being biased toward engagement with the valve seat;

the outlet valve body having an inlet end that is attached to the outlet end of the fuel delivery tube in fluid communication with the interior of the delivery tube, the outlet valve body having an outlet end that connects to the fuel inlet of the mobile fuel canister, the outlet end of the valve body fitting into the open interior of the fuel canister inlet collar and extending into end-to-end engagement with an inner end of the interior opening in the inlet collar; and a compressible resilient tip seal positioned between the outlet end of the outlet valve body and an end of the interior opening in the inlet collar so as to restrict pressurized gas from escaping from between the ends of the connected components, whereby the hose connector is connected securely to the inlet of the mobile canister by inserting the open outer end of the connector over the collar on the fuel inlet of the mobile canister and pressing the connector inwardly until the connector latches on the fuel inlet, the connector causing the outlet end of the outlet valve on the outlet of the fuel delivery tube to be brought into abutting contact with the inner end of the interior opening in the inlet collar in the fuel canister, with the tip seal sealing the junction therebetween, the fuel delivery tube resiliently yielding and sliding axially with respect to the annular body and attached latch members until the latch members become attached to the fuel canister inlet collar, so as to provide a snug, sealed fit between the outlet valves on the outlet of the fuel delivery tube and the inlet of the fuel canister.

6. A hose connector as in claim 5 wherein the tip seal is formed such that it resiliently and releasably clips on the end of fuel delivery outlet valve, such that the tip seal can be easily replaced by fuel dispensing personnel in order to ensure that fuel leakage during dispensing is minimized.

7. A hose connector as in claim 6 wherein the tip seal comprises a resilient end portion that fits on and covers the annular end of the outlet valve body, the tip seal having an opening therethrough for liquid petroleum gas to pass therethrough, the seal having an outer peripheral skirt thereon with an inwardly extending flange on an edge thereof that removably fits in an outer peripheral groove in the valve body adjacent the end thereof, the seal being accessible for replacement, such that fuel dispensing personnel can replace the tip seal whenever necessary.

* * * * *